US012007354B2

(12) United States Patent
Burch et al.

(10) Patent No.: US 12,007,354 B2
(45) Date of Patent: Jun. 11, 2024

(54) RAPID DETECTION AND IDENTIFICATION OF BACTERIA WITH GRAPHENE FIELD EFFECT TRANSISTORS AND PEPTIDE PROBES

(71) Applicants: Kenneth S. Burch, Brighton, MA (US); Tim van Opijnen, Somerville, MA (US); Jianmin Gao, Newton, MA (US); Narendra Kumar, Brighton, MA (US); Juan C. Ortiz-Marquez, Brighton, MA (US); Wenjian Wang, Brighton, MA (US); Mason Gray, Chestnut Hill, MA (US)

(72) Inventors: Kenneth S. Burch, Brighton, MA (US); Tim van Opijnen, Somerville, MA (US); Jianmin Gao, Newton, MA (US); Narendra Kumar, Brighton, MA (US); Juan C. Ortiz-Marquez, Brighton, MA (US); Wenjian Wang, Brighton, MA (US); Mason Gray, Chestnut Hill, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 0 days.

(21) Appl. No.: 17/090,982

(22) Filed: Nov. 6, 2020

(65) Prior Publication Data
US 2021/0140919 A1    May 13, 2021

Related U.S. Application Data

(60) Provisional application No. 62/932,832, filed on Nov. 8, 2019.

(51) Int. Cl.
*G01N 27/414*    (2006.01)

(52) U.S. Cl.
CPC ..... *G01N 27/4145* (2013.01); *G01N 27/4146* (2013.01); *G01N 27/4148* (2013.01)

(58) Field of Classification Search
CPC .......................................... G01N 27/414–4148
See application file for complete search history.

(56) References Cited

U.S. PATENT DOCUMENTS

2002/0037593 A1* 3/2002 Craighead .............. B82Y 30/00
436/518
2005/0224346 A1* 10/2005 Holm-Kennedy ..........................
G01N 33/54373
204/414

(Continued)

OTHER PUBLICATIONS

Definition of "peptide" from the on-line diction of the National Cancer Institute available at URL: https://www.cancer.gov/publications/dictionaries/cancer-terms/def/peptide (Year: 2023).*

*Primary Examiner* — Erik Kielin
(74) *Attorney, Agent, or Firm* — BOND, SCHOENECK & KING, PLLC; Joseph Noto

(57) ABSTRACT

A method and system for label-free detection of pathogenic and antibiotic resistant bacteria is disclosed. The method includes fabricating a G-FET/peptide device having a synthesized peptide probe capable of recognizing and binding to a bacterial target; performing electric-field assisted binding of at least one bacterial cell of the bacterial target to the G-FET/peptide device; and electrically detecting the binding of the at least one bacterial cell to the G-FET/peptide device.

18 Claims, 23 Drawing Sheets

(56) References Cited

U.S. PATENT DOCUMENTS

| | | | |
|---|---|---|---|
| 2007/0178477 A1* | 8/2007 | Joiner, Jr. | G01N 27/4146 977/924 |
| 2011/0117669 A1* | 5/2011 | Ren | G01N 27/4145 257/E29.089 |
| 2013/0040283 A1* | 2/2013 | Star | G01N 27/127 977/734 |
| 2015/0069329 A1* | 3/2015 | Jeon | B81C 1/00087 257/29 |
| 2016/0123973 A1* | 5/2016 | Cubukcu | G01N 27/4145 438/49 |
| 2017/0234861 A1* | 8/2017 | Chen | G01N 33/5438 435/6.11 |
| 2018/0277279 A1* | 9/2018 | Brereton | H02S 40/20 |
| 2021/0389272 A1* | 12/2021 | Ho | G01N 27/4145 |

* cited by examiner

RAPID DETECTION AND IDENTIFICATION OF BACTERIA WITH GRAPHENE FIELD EFFECT TRANSISTORS AND PEPTIDE PROBES

CROSS REFERENCE

This application claims the benefit of the filing date of U.S. Provisional Patent Application Ser. No. 62/932,832, filed Nov. 8, 2019, which is hereby incorporated by reference in its entirety.

The current technology was developed using funds supplied by the National Institutes of Health (NIH) under grant Nos. AI110724, AI124302, GM102735, GM102431, and GM124231 and National Science Foundation under grant No. DMR-1709987. Accordingly, the U.S. Government has certain rights to this invention.

FIELD

The present invention is directed to a method and system for electrical detection of bacteria, and in particular to antibiotic resistant bacteria.

BACKGROUND

Bacterial infections cause a wide range of diseases and significant mortality. While antibiotics are key in controlling disease severity and reducing mortality, their over prescription and misuse are some of the most important factors in the surge of antibiotic resistant cases around the world. In order to solve this crisis, diagnostic methods are needed that can rapidly and accurately identify the bacterium causing the infection and determine its associated antibiotic resistance profile. Antibiotic susceptibility testing (AST) is mostly carried out by phenotypic methods that require prior identification of bacterial pathogens from patients (at the species and/or strain level) and incubation under antibiotic conditions, a lengthy process that can take up to 24 hours to a month depending on the species. Moreover, both species/strain identification and AST require trained specialists, specific laboratory environments and often expensive instrumentation. Since these conditions limit widespread application and implementation into actual treatment strategies at most points of care, there is much room for improvement to develop new diagnostic devices that have the potential for adoption across a large variety of use cases. Ideally these devices would be cheap, easy to implement, scalable, and accurately identify both the pathogen as well as its antibiotic resistance profile with high specificity and sensitivity.

Graphene field effect transistors (G-FETs) have been gaining attention due to their high sensitivity in detection of biomarkers and DNA, scalability, biocompatibility and ease of incorporation on conventional and flexible substrates. However, the use of G-FET sensors for bacterial detection is still in its infancy with only a small number of papers describing the detection of a lab strain of *Escherichia coli*, but no reports on the sensing of clinically relevant pathogenic bacteria, nor on antibiotic resistant strains. An impediment to the broad use of G-FETs for bacterial sensing lies in the lack of suitable probes which should be readily available, easily handled (simple preparation and/or long shelf life), and strain-specific.

A crucial issue for this approach is very small changes in current that are required to be detected. Specifically, the previous work resulted in only a 2% change, which can easily be mimicked in a real device by temperature or fluid fluctuations, let alone electrical noise. Indeed, the focus on changes in current are due to the previous approaches inability to detect large changes in charge on the G-FET. This occurred due to the reliance on large aptamer probes with significant induced charge (resulting in a gate voltage change of the Dirac point of 0.2V), before attachment of the target. Similarly, in order to ensure the target reached the active region of the G-FET, the device active area was $1.2 \times 10^4$ µm². An equally crucial challenge is enhancing the sensitivity to achieve detection at a clinically relevant cell density. This is limited, in part, by the typical large charge and size of most probes. As such the probes strongly shift the Dirac voltage (point of charge neutrality—$V_D$), or keep the target beyond the Debye screening length, such that only small changes in electrical resistance are observed upon attachment. Indeed, most studies have relied on changes in source-drain current, due to relatively small shifts in $V_D$ upon attachment. This results from the fixed amount of charge per cell, whereas the shift is dependent on the induced charge density. As such the effect of the bacteria on a single G-FET could be enhanced with smaller active areas, however this also requires a far higher cell density, potentially at a level that is much above what is considered to be clinically relevant.

Conventional time-consuming, expensive and low sensitivity diagnostic methods used for monitoring bacterial infections lead to unnecessary or delays in prescription of the right antibiotic treatment. Determining an optimal clinical treatment requires rapid detection and identification of pathogenic bacteria and their sensitivity to specific antimicrobials. However, diagnostic devices that meet all of these criteria have proven elusive thus far.

SUMMARY

In accordance with one aspect of the present disclosure, there is provided a method for the label-free detection of bacteria, including:
  fabricating a graphene field effect transistor (G-FET);
  synthesizing a peptide probe capable of recognizing and binding to a bacterial target;
  integrating the peptide probe on the G-FET to provide a G-FET/peptide device;
  performing electric-field assisted binding of at least one bacterial cell of the bacterial target to the G-FET/peptide device; and
  electrically detecting the binding of the at least one bacterial cell to the G-FET/peptide device.

In accordance with another aspect of the present disclosure, there is provided a label-free bacteria detection system, including:
  a graphene field effect transistor (G-FET)/peptide device comprising a peptide probe capable of recognizing and binding to a bacterial target integrated on the G-FET.

These and other aspects of the present disclosure will become apparent upon a review of the following detailed description and the claims appended thereto.

DETAILED DESCRIPTION

Figure 1A:
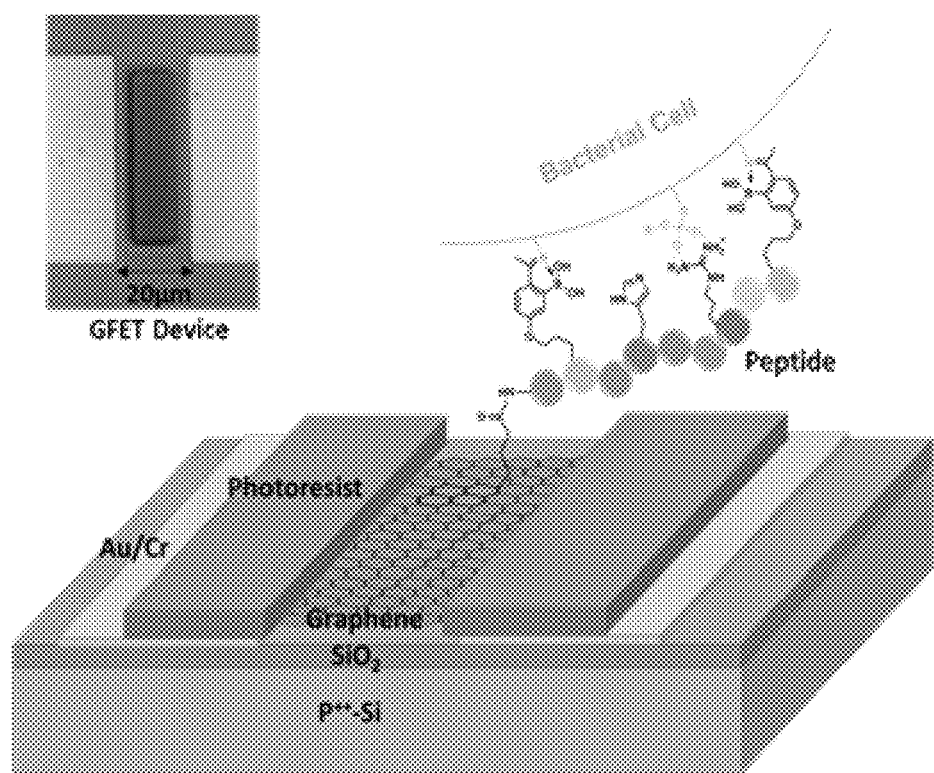
FIG. 1A is a schematic of a G-FET functionalized with a pyrene-conjugated peptide probe binding to the surface of a bacterium, the inset is a light microscopy image of a G-FET.

The present invention demonstrates features and advantages that will become apparent to one of ordinary skill in the art. The present invention incorporates graphene field effect transistors (G-FETs), since they are highly sensitive to chemical/biological modification, can have fast detection times and can be placed on different substrates. By integrating specific peptide probes over G-FETs, the present invention presents a method for species and strain specific label-free detection of clinical strains of pathogenic bacteria with high specificity and sensitivity. The present pyrene-conjugated peptides immobilized on G-FETs are capable of detecting pathogenic *Staphylococcus aureus* at the single-cell level and discriminate against other gram-positive and gram-negative bacterial pathogens. A similar device was able to discriminate between antibiotic resistant and sensitive strains of *Acinetobacter baumannii*, suggesting that these devices can also be used for detecting antibiotic resistive pathogens. Furthermore, the present method of enhancing attachment, electric-field assisted binding, reduced the detection limit to $10^4$ cells/ml and the detection time to below 5 minutes. The combination of single step attachment, inexpensive production, rapid, selective and sensitive detection suggest G-FETs plus pyrene-conjugated peptides are a platform for solving major challenges faced in point of care diagnostics to fight infectious diseases and antimicrobial resistance.

The present invention provides a method and system for species and strain specific label-free detection of clinical strains of pathogenic bacteria with high specificity and sensitivity. The method is scalable, cheap, and does not require expensive equipment to operate, unlike methods based on culture and optical detection. In addition, the use of electric field assisted attachment enables higher sensitivity and speed. The invention also can be stored at room temperature and prepared without significant expertise.

Herein, the present invention describes G-FET sensors and protocol for their implementation with diverse pathogenic bacterial species. Specifically, the present invention utilizes specially selected synthetic peptides as probes for bacterial capture and pushes the bacteria to the graphene with electrical pulses to lower the limit of detection to $10^4$ cells/ml (within a clinical relevant regime) and to lower the time of detection to 5 minutes. The present method can detect a clinically relevant pathogenic bacterial concentration, for example, a range from $10^4$ cells/ml to $10^7$ cells/ml of bacterial cells. The produced peptides conjugated with pyrene, enable simple one step non-covalent functionalization on G-FETs that can be stored at room temperature for weeks. The chemically modified peptides used in this method are relatively inexpensive to produce and solve the issue of lower level of selectivity for instance observed with antimicrobial peptides. The peptides also provide an advantage over antibodies or aptamers, namely their small size and neutral (no net charge) state. This results in large changes in $V_D$ per bacteria, allowing for single cell electrical detection on G-FET. Importantly, the G-FET design enabled direct quantitative comparison of the electrical and optical readout by simple optical imaging of G-FET. Combined with a method of applying gate pulses to push the bacteria to the graphene, the present method overcame the tradeoff between the probability of attachment and $V_D$ shift per bacteria. The wide applicability of these peptide probes enabled detection of different pathogenic bacterial species, as well as an antibiotic resistant strain at a single cell level. Thereby the present invention with G-FET plus peptide combination offers a promising route towards cheap, fast, multiplexed and low concentration detection of clinically relevant pathogenic bacterial species and their antibiotic resistant variants.

The present invention overcame prior art challenges by a combination of multiple factors. Specifically, the implementation of the peptide probes in accordance with the present methods and performing electric-field assisted binding, for example by the use of dielectrophoresis, to guide the bacteria to the active region, were employed. The former resulted in essentially no change in the Dirac gate voltage before attachment, dramatically enhancing sensitivity to induced charge on the device. The dielectrophoresis allowed for the same probability of attachment of the target, without the need for a large area of the G-FET. Specifically, the present devices were only $4 \times 10^2$ µm$^2$ in area. These two orders of magnitude reduction in area produced a far superior performance in sensitivity to charge (a single bacteria sitting on the device could be detected as it results in 0.1 meV shift in the Dirac point). Comparing with the prior art where the application of $10^6$ CFU/ml on the device results in only 0.05 V shift, the present invention achieves a 0.12 V shift in the Dirac point with only $10^4$ CFU/ml of pathogenic bacteria. This latter concentration achieved by the present invention is in the regime of relevance to infections at the point of care (e.g., a typical *Staphylococcus aureus* infection produces 4×10⁵ CFU/ml in saliva). In addition, the dramatic reduction in the size of the device, enables fabrication of many G-FETs on single chip. Nonetheless, enabling further reduction of the needed active area, also allows for multiplexing by placing in the sample space numerous G-FET elements with a variety of probes. This is important for reducing the eventual cost and for placing many G-FETs functionalized with different probes on the same platform. The later is important as the number of bacteria can be the cause of an infection. Furthermore, it is ideal to include sensitivity to antibiotic resistant bacteria to improve treatment. Thus, the combination of the optimized design, electrical protocols of attachment (e.g., dielectrophoresis), and the peptide probes prepared according to the present invention provide a far superior performance for point of care detection compared to the prior art. In addition, the present invention provides the first detection of pathogenic and antibiotic resistant bacteria using G-FETs, similarly important for implementation in real world settings.

The present invention provides a method for the label-free detection of bacteria, including the following steps: fabricating a graphene field effect transistor (G-FET); synthesizing a peptide probe capable of recognizing and binding to a bacterial target; integrating the peptide probe on the G-FET to provide a G-FET/peptide device; performing electric-field assisted binding of at least one bacterial cell of the bacterial target to the G-FET/peptide device; and electrically detecting the binding of the at least one bacterial cell to the G-FET/peptide device.

G-FETs known in the art are suitable for use in the method of the present invention. Peptide probes capable of recognizing and binding to a bacterial target are suitable for use in the present method. Suitable probes can be made using standard peptide synthesis as shown by the experimental procedures below.

Electric-field assisted binding is used to bind a bacterial cell of the bacterial target to the G-FET/peptide device. To improve the sensitivity of G-FET, by applying voltage pulses from the top of the well that holds the sample, the charge of the bacteria is exploited to drive them to the graphene surface. Specifically, for example, a negative voltage of 0.5 V was applied to the Pt electrode with five pulses, 10 seconds in duration to minimize potential damage to the bacteria. Moreover, electric-field assisted binding decreased the original incubation time before bacteria could be detected from 45 minutes to 5 minutes. Similar to the 45-minute incubation method without electric-field attachment, the Dirac voltage shift found in the electric-field assisted attachment is dependent on the number of bacteria on the device.

The binding of a single bacterial cell to the G-FET/peptide device can be electrically detected. The present method can detect up to 3 cells per G-FET. A Dirac shift of 100 mV was seen for a concentration of 10⁴ cell/ml, a Dirac shift of 150 mV for 10⁵ cell/ml, and a Dirac shift of 200 mV for 10⁶ cell/ml.

The present device can be used for a variety of purposes including determining the cause of an infection (viral versus bacterial), the specific strain of the infection, and/or whether the infection results from an antibiotic resistant strain. Moreover, the limited chemicals required for preparation, simplicity of operation, low cost and speed of the device implies it can be used at point of care in a variety of settings, clinician's office, hospitals, ER, urgent care and in low resource settings.

Suitable bacterial targets include *S. aureus* (ATCC 6538), wild-type *A. baumannii* (AB5075)[50], *A. baumannii* (5075 LOS-)[51], *B. subtilis*, and *E. coli*. Each of the ESKAPE pathogens can be detected in accordance with the method of the present invention. A larger range of bacteria are possible with the preparation of suitable peptide or aptamer probes.

Figure 1B:
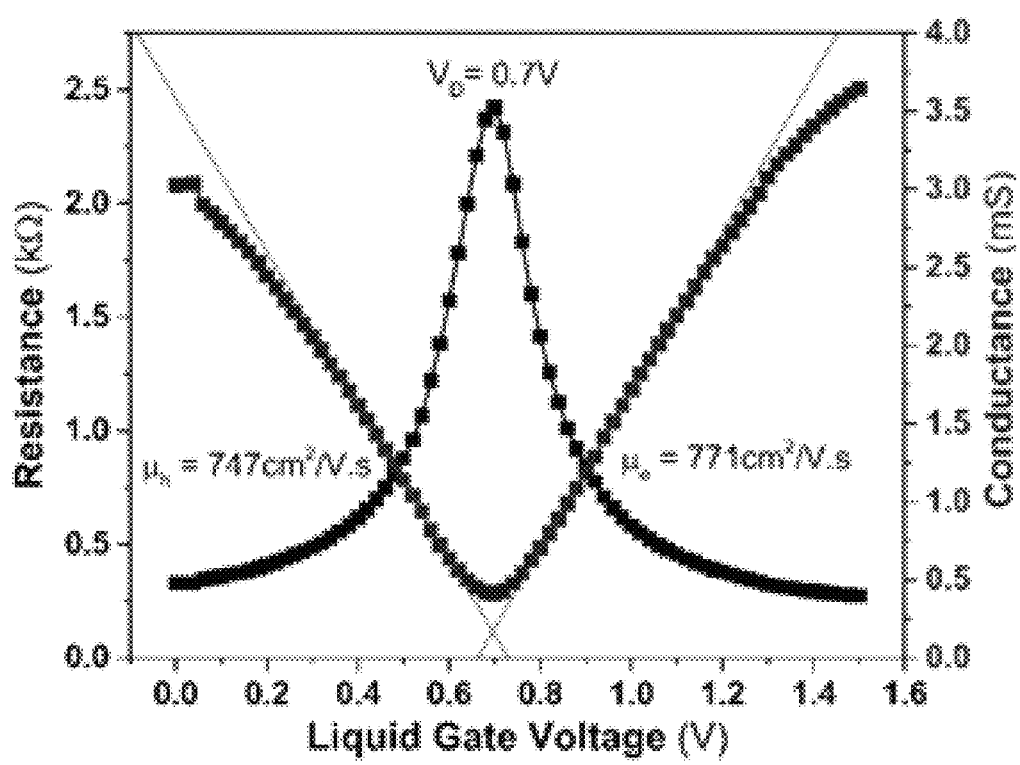
FIG. 1B is a plot of resistance/conductance vs voltage of a G-FET.
Figure 1C:
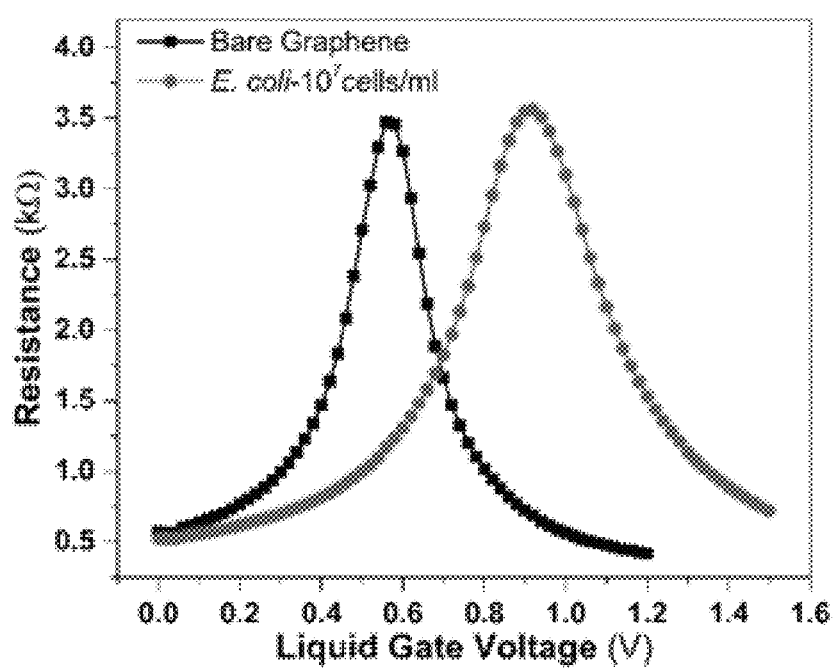
FIG. 1C is a plot of resistance/conductance vs voltage of a G-FET before and after adsorption of *E. coli*.
Figure 1D:
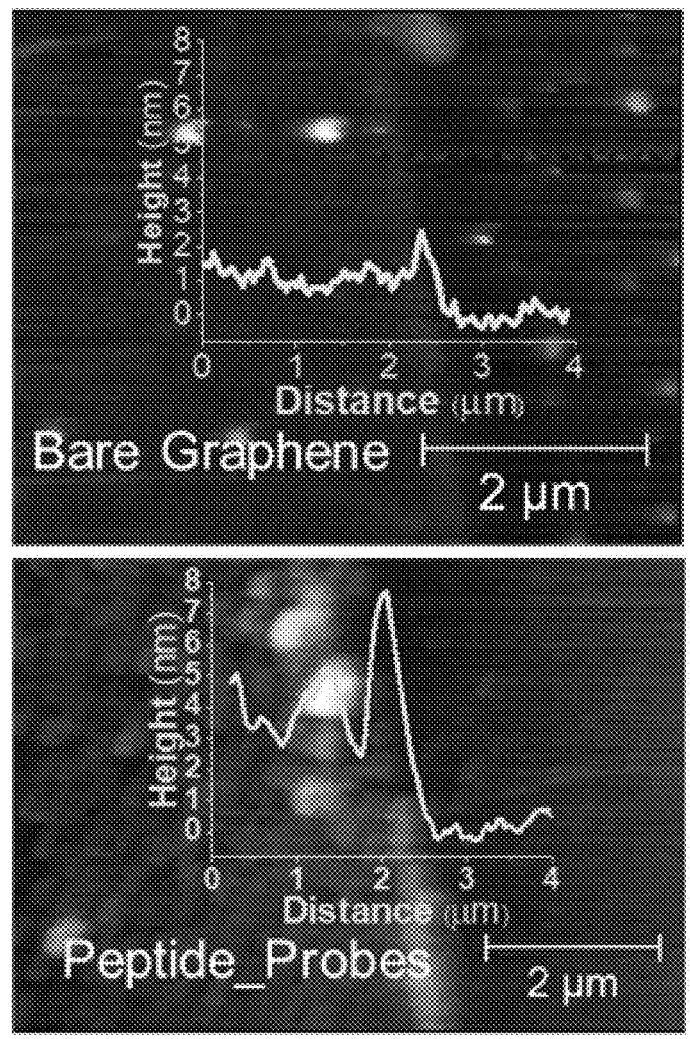
FIG. 1D is an AFM image of the patterned graphene before and after peptide functionalization.
Figure 1E:
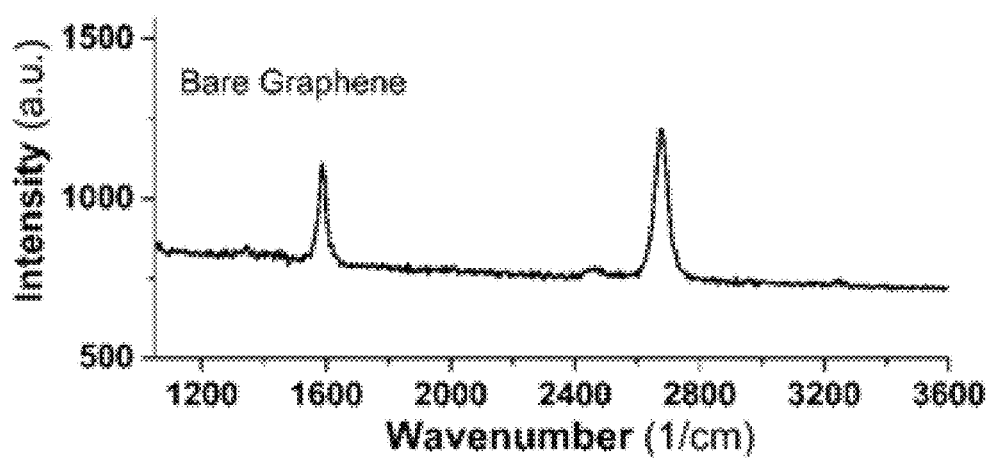
FIG. 1E is a Raman spectrum (532 nm excitation) of CVD graphene transferred over SiO$_2$/Si surface.

FIGS. 1A-1E show a scheme of functionalization and characterization of G-FETs. FIG. 1A is a schematic of a G-FET functionalized with a pyrene-conjugated peptide probe binding to the surface of a bacterium. The inset shows a light microscopy image of G-FET, with an active area of 20×40 μm, located in between two gold contacts. FIG. 1B shows resistance/conductance vs voltage plots of G-FET representing the Dirac voltage (0.7 V), hole and electron mobilities of 747 and 771 $cm^2/V\cdot s$. FIG. 1C shows G-FET characteristics before and after adsorption of *E. coli*. A shift of 360 mV in the Dirac voltage observed when G-FET with bare graphene was incubated with *E. coli* (pink circles) in comparison with the bare graphene (black squares). FIG. 1D is an AFM image of the patterned graphene before and after peptide functionalization. After functionalization, the coverage of the graphene channel by the P-KAM5-peptide probe is shown as an increase in height of ~2.5 nm (lower panel) compared with the bare graphene surface (upper panel). FIG. 1E is a Raman spectrum (532 nm excitation) of CVD graphene transferred over $SiO_2$/Si surface. The spectrum shows 2D peak at 2,679 $cm^{-1}$ and G peak at 1,587 $cm^{-1}$ with $I_{2D}/I_G$~1.6, suggesting the graphene is monolayer. Absence of D peak ~1350 $cm^{-1}$ indicating defect free graphene.

Figure 2:
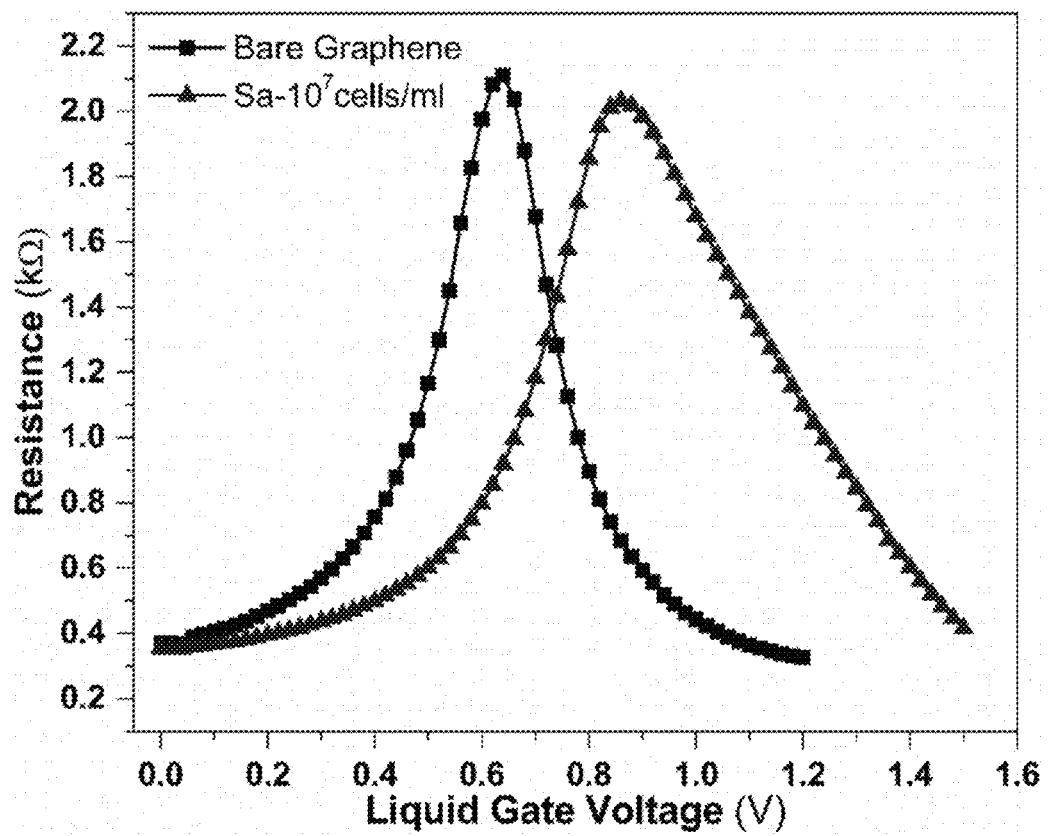
FIG. 2 is a plot of G-FET characteristics before and after adsorption of *S. aureus* in comparison with the bare graphene.

FIG. 2 shows G-FET characteristics before and after adsorption of *S. aureus*. A shift of 220 mV in the Dirac voltage observed when G-FET with bare graphene was incubated with *S. aureus* (Blue Triangles) in comparison with the bare graphene (black squares).

Figure 3A:
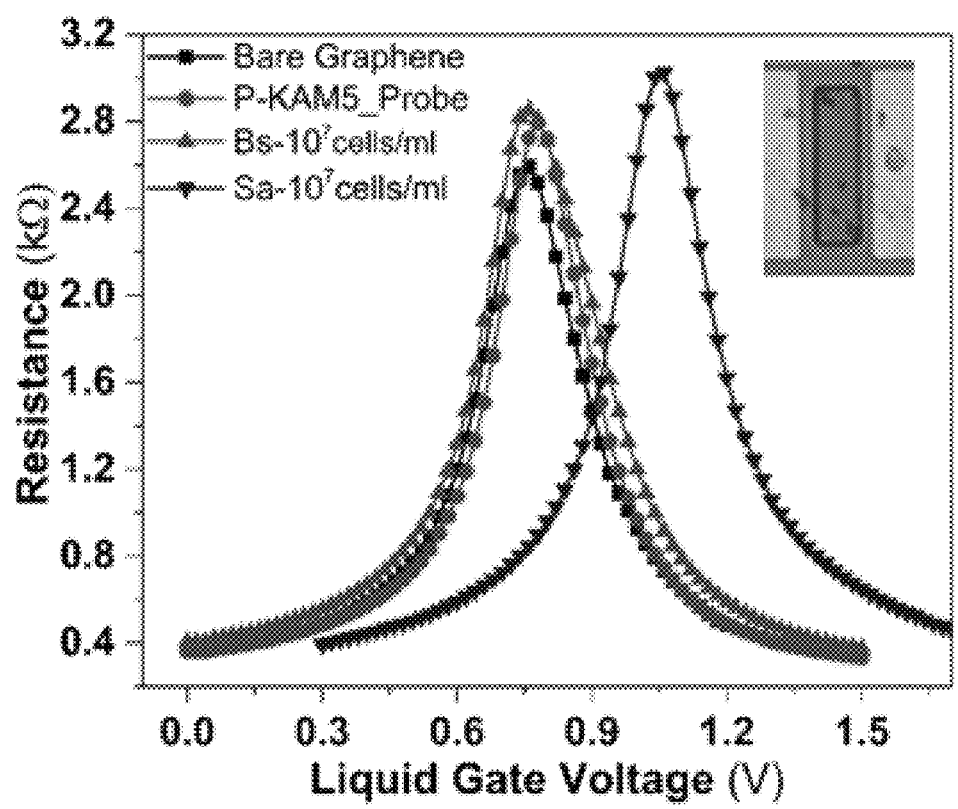
FIG. 3A is a plot of resistance vs voltage of G-FET for detection of *S. aureus*.
Figure 3B:
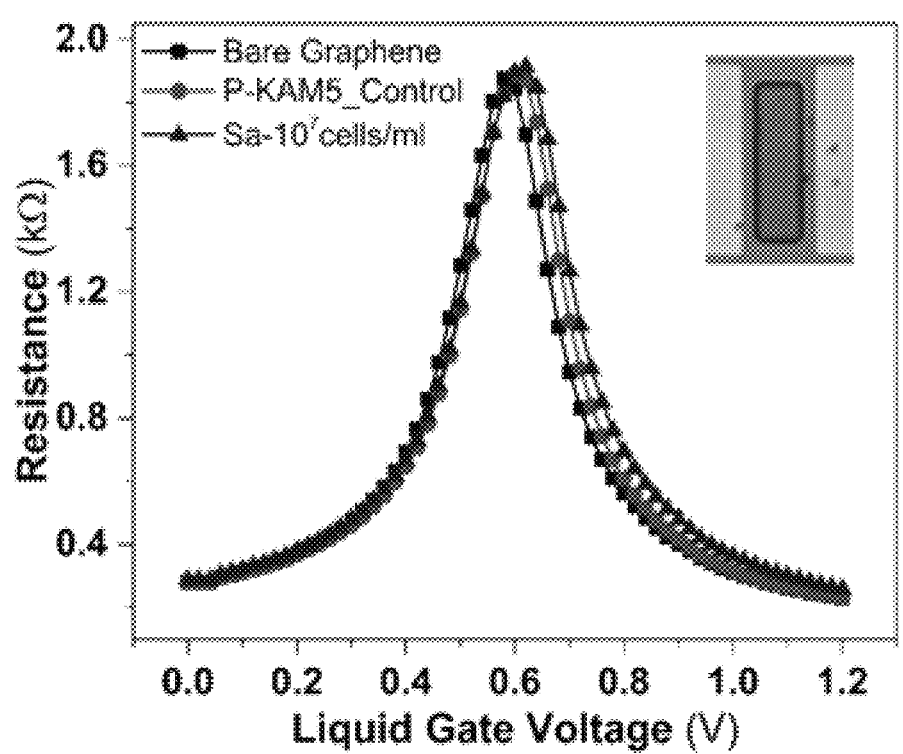
FIG. 3B is a plot of G-FET functionalized with control peptides and incubated with *S. aureus*.
Figure 3C:
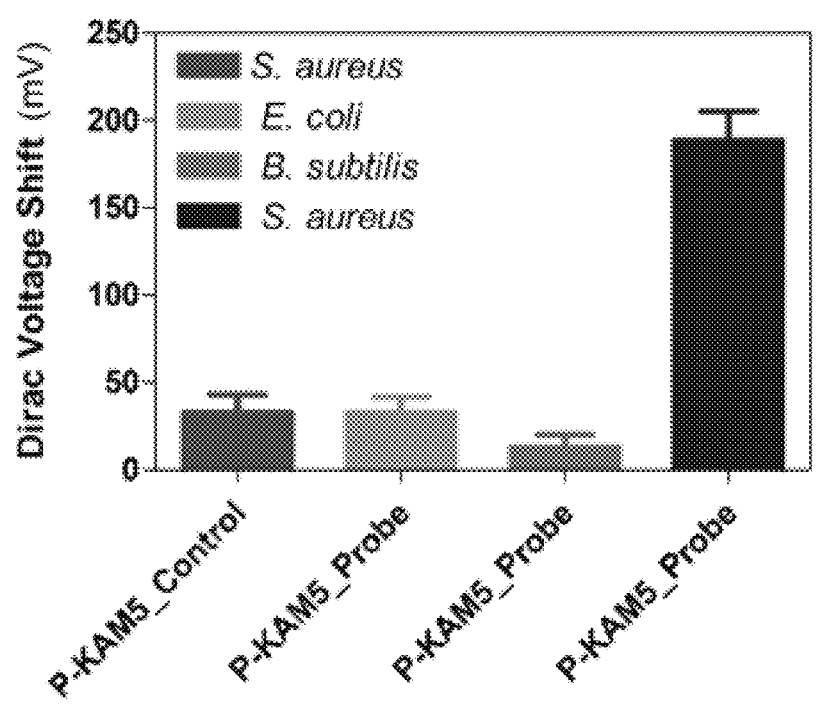
FIG. 3C is a bar chart showing comparative values of average voltage shift with specific and unspecific detection of *S. aureus*.
Figure 3D:
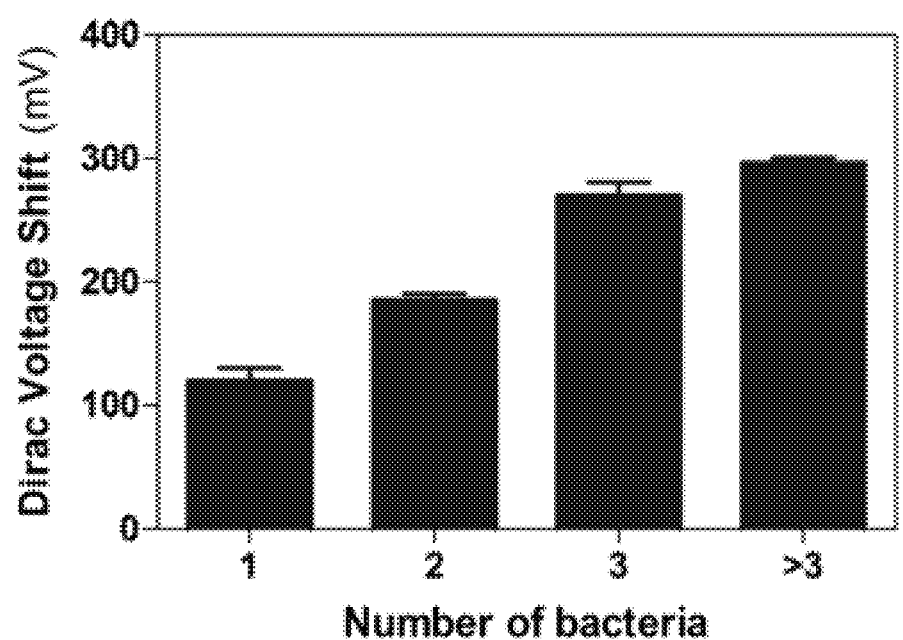
FIG. 3D is a bar chart showing measured Dirac voltage shift of G-FETs having different number of bacteria (*S. aureus*) attached.

FIGS. 3A-3D show specific resistance vs voltage plots of G-FET detection results of *S. aureus*. FIG. 3A shows G-FET functionalized with Probe peptides (P-KAM5_Probe) and incubated with *B. subtilis* and *S. aureus* at a concentration of 10⁷ cells/ml. No shift was observed with peptides and *B. subtilis* while a shift of ~300 mV is seen with *S. aureus* as well as the attachment of bacterial cells to the graphene (see image in inset). FIG. 3B shows G-FET functionalized with control peptides (P-KAM5_Control) and incubated with *S. aureus* at a concentration of 10⁷ cells/ml. No voltage shift was observed after the incubations with peptide as well as with bacteria. Additionally, no attachment of bacterial cells on the graphene was observed (see image in inset). FIG. 3C shows comparative values of average voltage shift with specific and unspecific detection of *S. aureus*. No notable shift was observed when G-FET were functionalized with P-KAM5_Control and incubated with *S. aureus* at a concentration of 10⁷ cells/ml. Furthermore, no notable shift was observed when G-FET were functionalized with P-KAM5_Probe and incubated with unspecific bacteria (*E. coli* and *B. subtilis*) at a concentration of 10⁷ cells/ml. An average shift of ~190 mV was observed when G-FET functionalized with P-KAM5_Probe and incubated with *S. aureus* at a concentration of 10⁷ cells/ml. (Data represents average and standard deviation of at least 6 independent replicates). FIG. 3D shows measured Dirac voltage shift of G-FETs having different number of bacteria (*S. aureus*) attached. Devices having single bacterium attached show an average shift of ~130 mV and linear increase in voltage shift is observed with increased number of bacteria attached. (Data represents average and standard error of at least 3 independent replicates).

Figure 4:
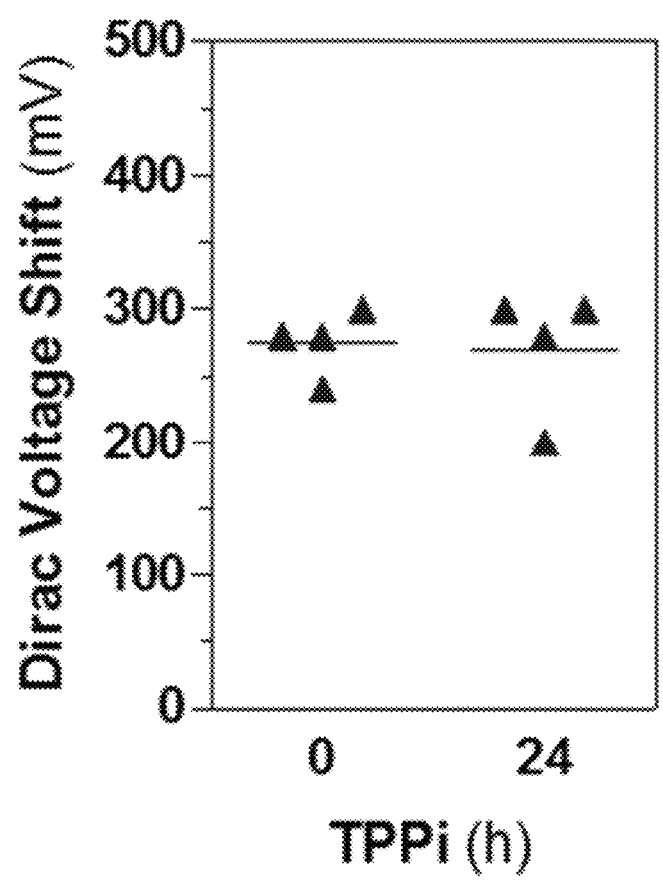
FIG. 4 is a bar chart showing a stability test for different GFETs functionalized with P-KAM5_Probe.

FIG. 4 shows the stability test. Different GFETs functionalized with P-KAM5_Probe and stored for 24 h and then detection of *S. aureus* at $10^7$ cells/ml was performed. Measured Dirac voltage shift of different G-FETs after 0 h and 24 h time post probe incubation (TPPi).

Figure 5A:
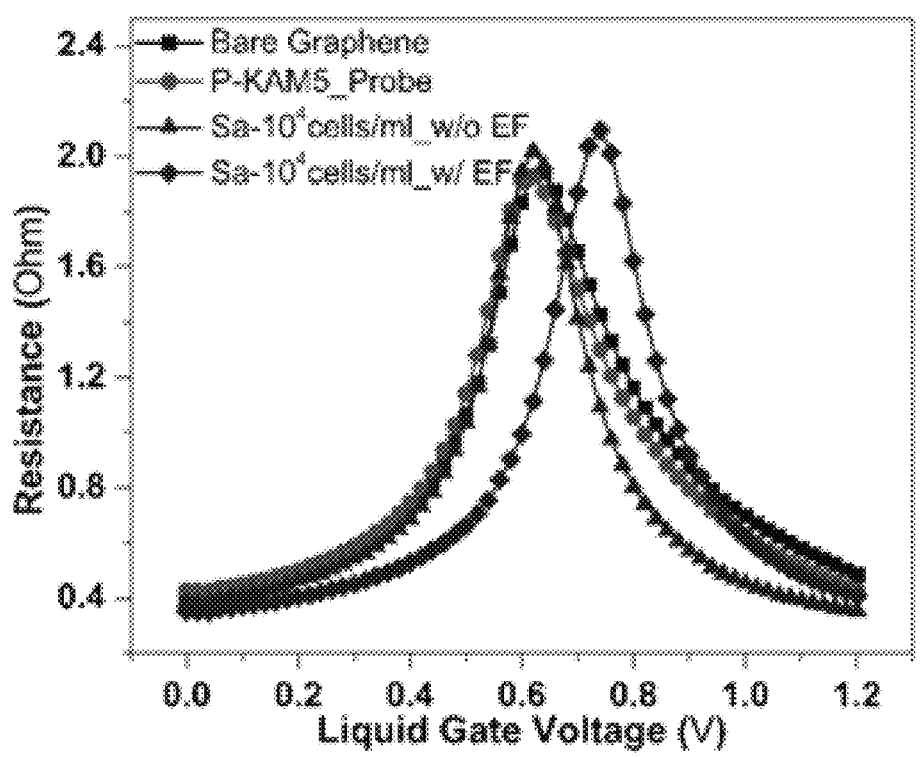
FIG. 5A is a plot showing detection with electric field assisted binding of *S. aureus* at $10^4$ cells/ml.
Figure 5B:
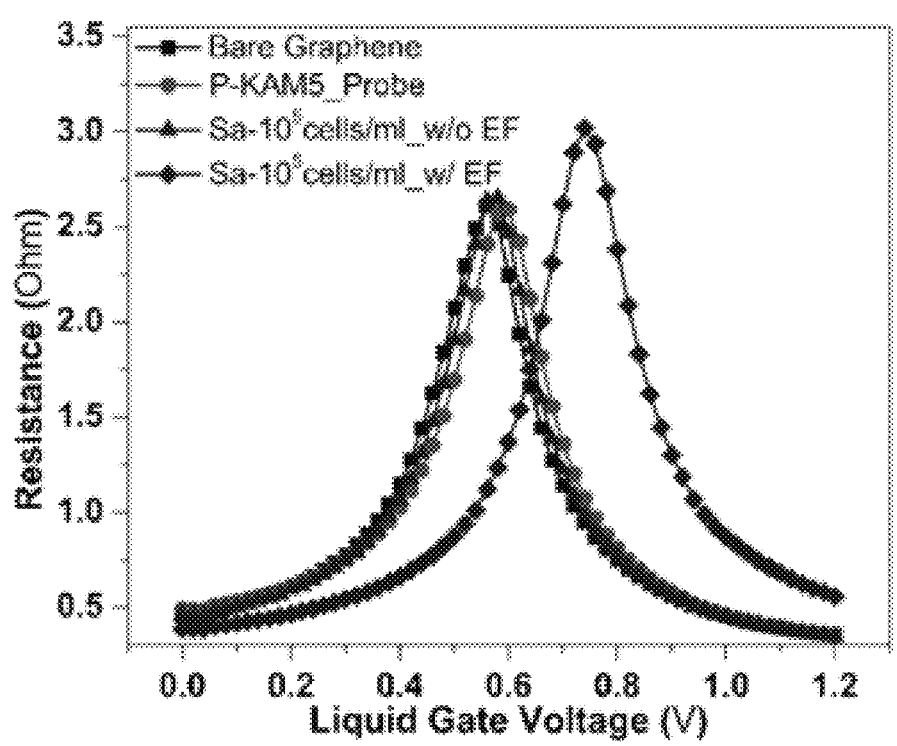
FIG. 5B is a plot showing detection at $10^5$ cells/ml.
Figure 5C:
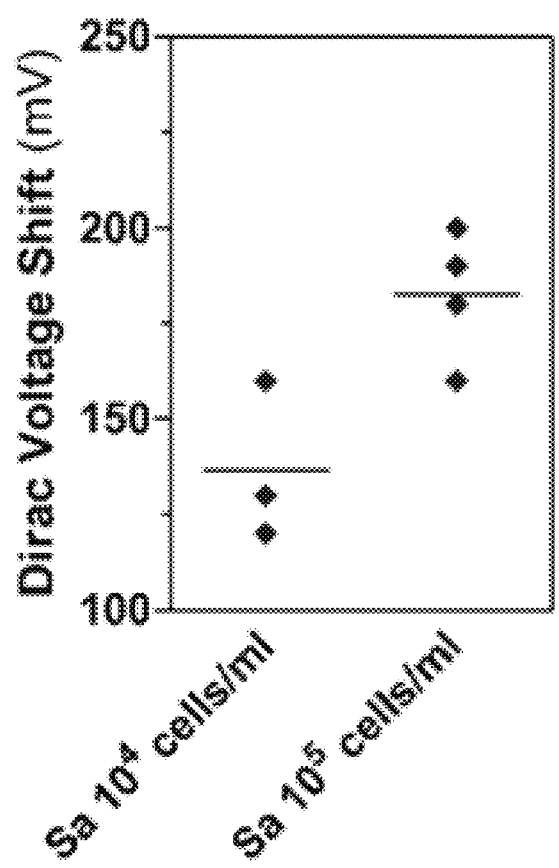
FIG. 5C is a bar chart showing the Dirac voltage shift obtained with the two concentrations of *S. aureus* after electric field assisted binding.

FIGS. 5A-5C show lowering detection with electric field assisted binding. Resistance versus voltage plots of G-FET functionalized with Probe peptides (P-KAM5_Probe) before (blue triangle) and after (blue diamond) electric field (EF) assisted binding of *S. aureus* at $10^4$ cells/ml are shown in FIG. 5A and $10^5$ cells/ml are shown in FIG. 5B. FIG. 5C is a chart which shows the Dirac voltage shift and average obtained with two concentrations of *S. aureus* after electric field assisted binding.

Figure 6:
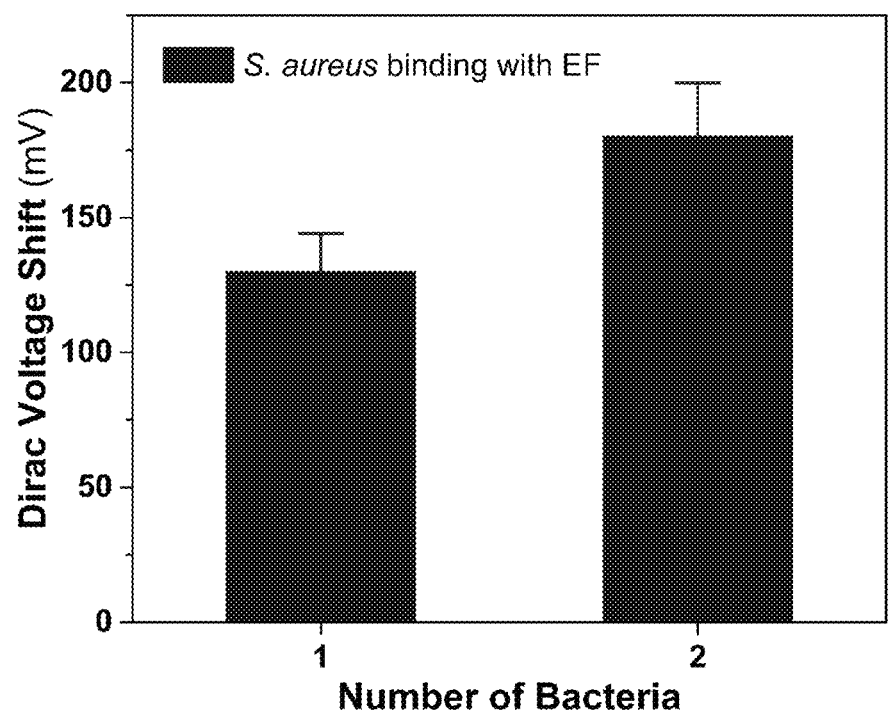
FIG. 6 is a bar chart showing measured Dirac voltage shift of G-FETs having different number of bacteria.

FIG. 6 shows measured Dirac voltage shift of G-FETs having different number of bacteria (*S. aureus*) attached obtained with electric field assisted binding at a concentration of $10^4$ and $10^5$ cells/ml.

Figure 7A:
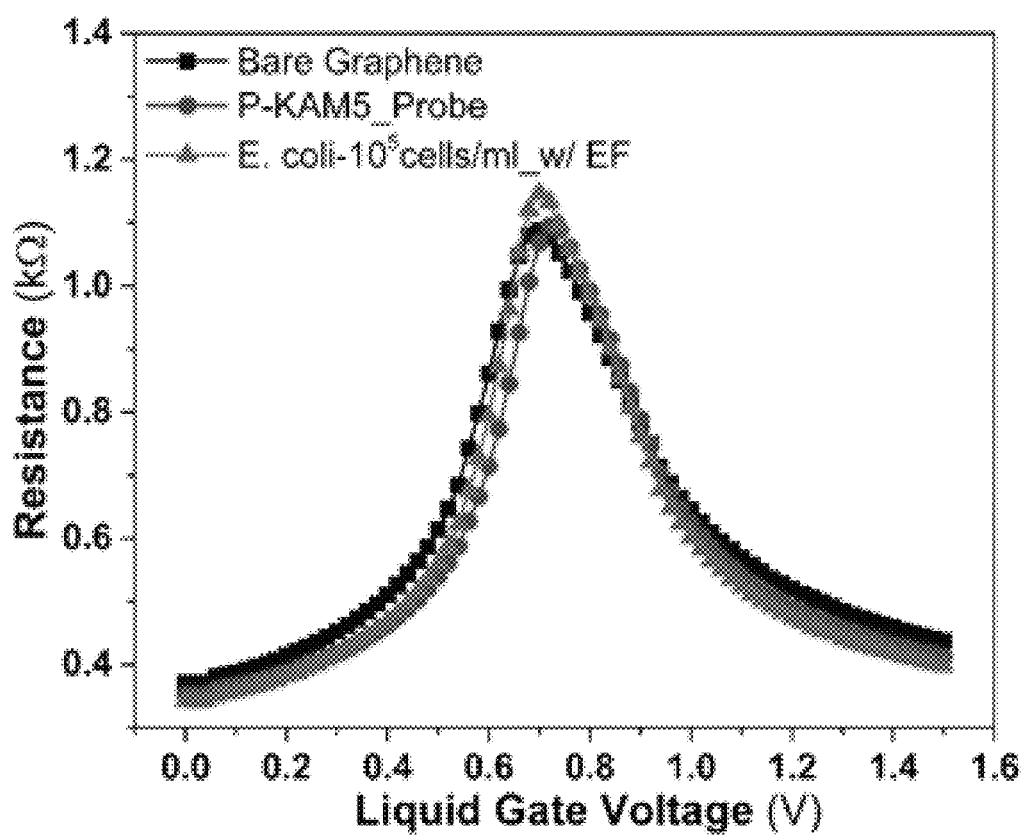
FIG. 7A is a plot of resistance versus voltage of G-FET functionalized with Probe peptides (P-KAM5_Probe) after binding of *E. coli*.
Figure 7B:
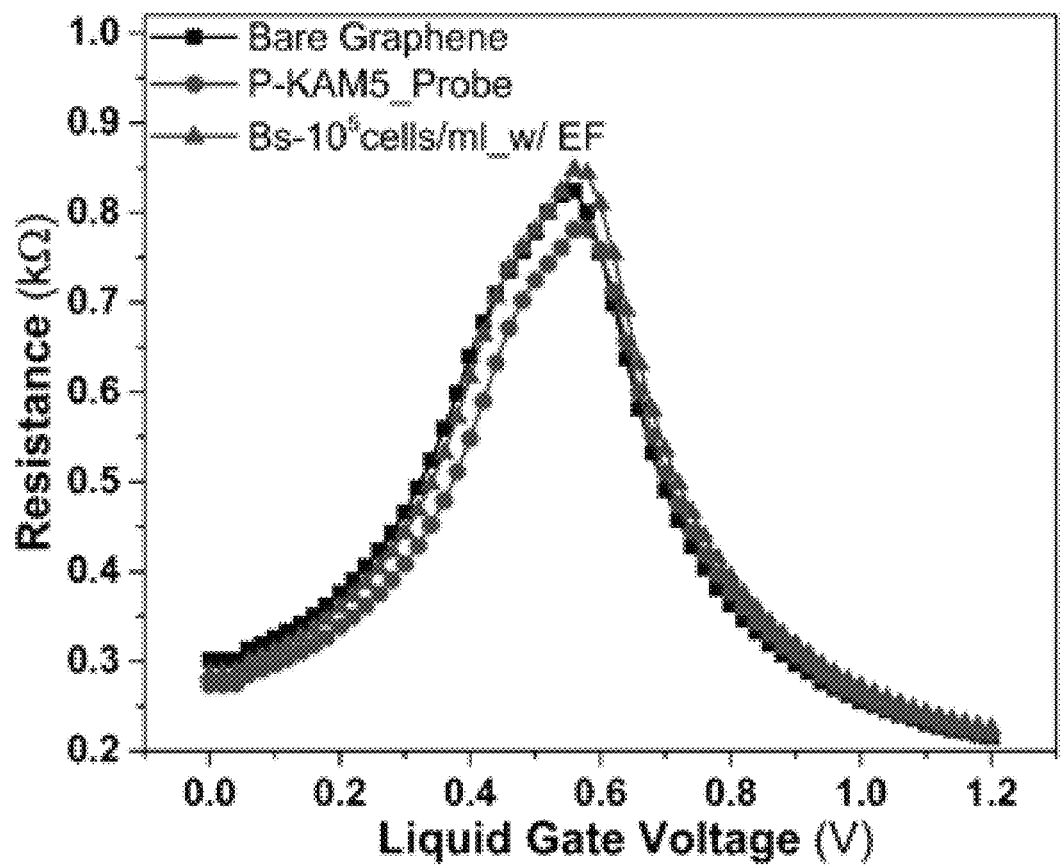
FIG. 7B is a plot of resistance versus voltage after binding of *subtilis* and FIG. 7C is a plot of resistance versus voltage plots of G-FET functionalized with control peptides (P-KAM5_control) after binding of *S. aureus*.
Figure 7C:
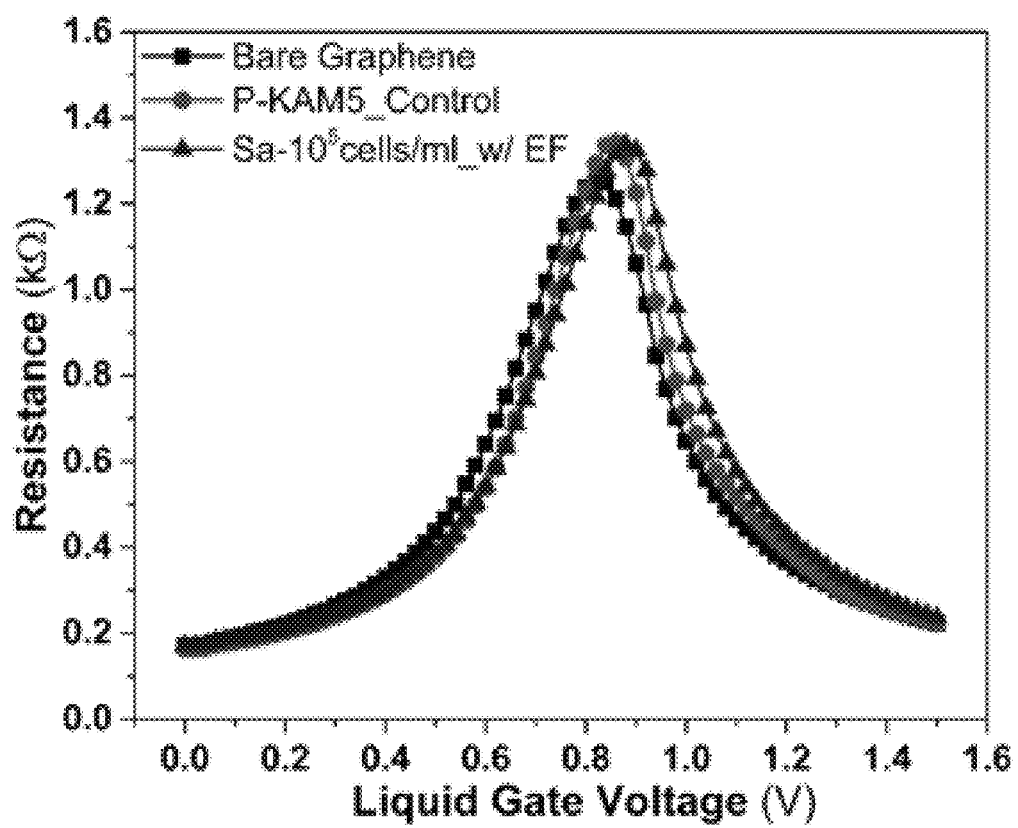

FIGS. 7A-7C show resistance versus voltage plots of G-FET functionalized with Probe peptides (P-KAM5_Probe) and after electric field assisted binding of *E. coli* at $10^5$ cells/ml (FIG. 7A), *B. subtilis* (FIG. 7B). Resistance versus voltage plots of G-FET functionalized with control peptides (P-KAM5_control) and after electric field assisted binding of *S. aureus* at $10^5$ cells/ml (FIG. 7C).

Figure 8A:
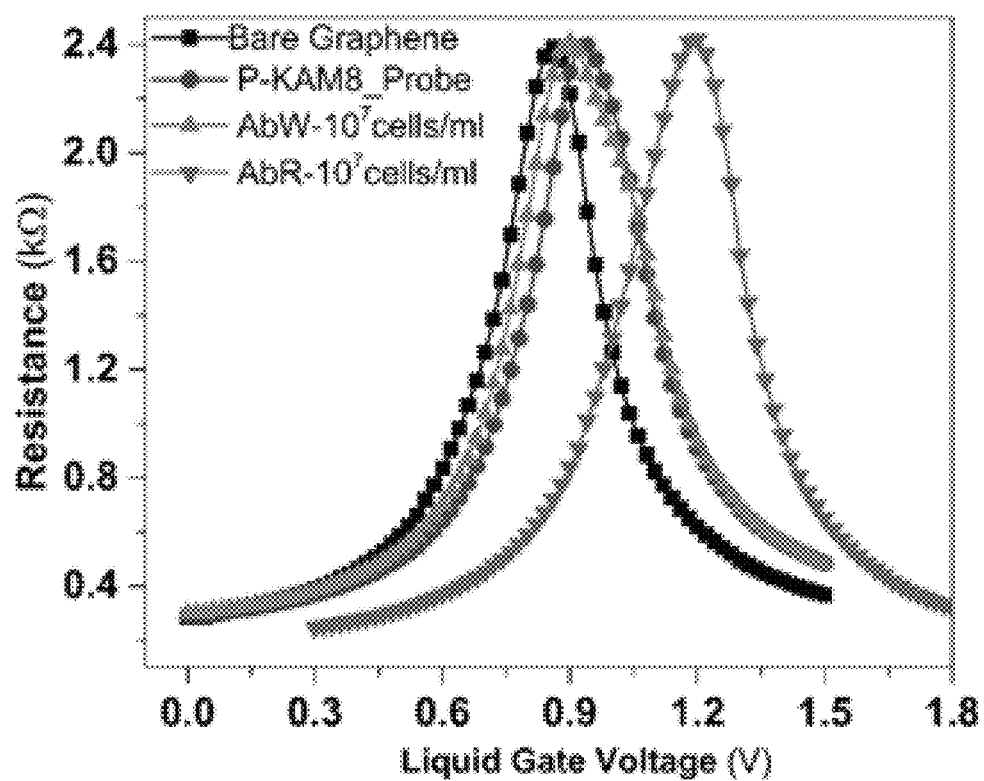
FIG. 8A is a plot of resistance vs voltage of G-FET for detection of *A. baumannii
Figure 8B:
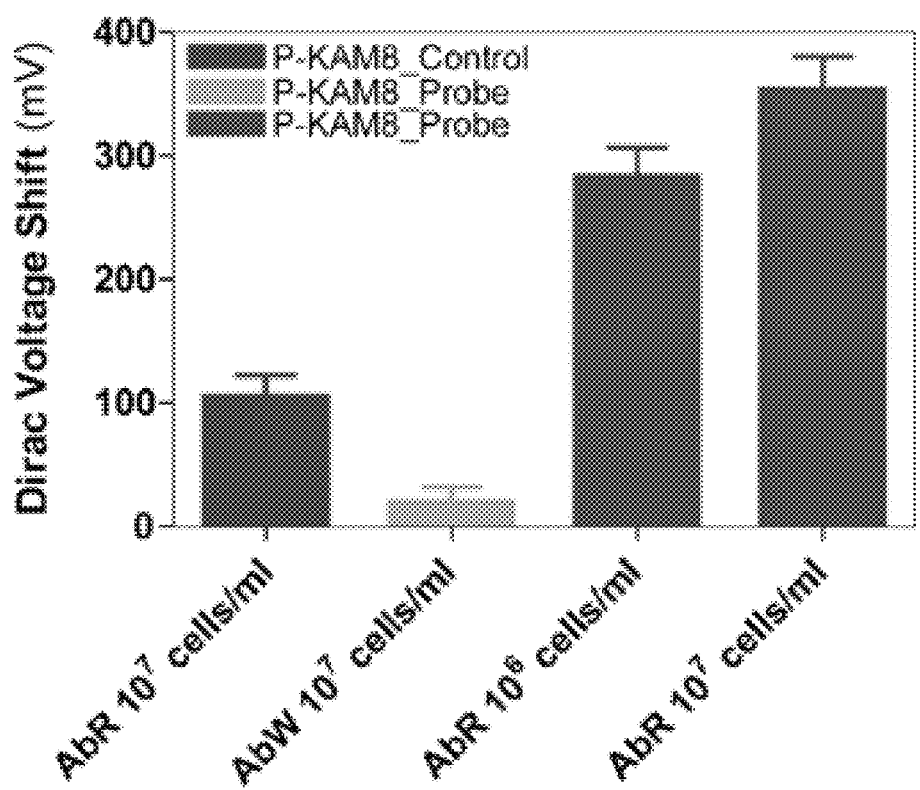
* and FIG. 8B is a bar chart showing specific detection results of *A. baumannii*.

FIGS. 8A-8B show specific detection results of *A. baumannii*. FIG. 8A shows resistance vs voltage plots of G-FET for detection of *A. baumannii* with probe peptides KAM8. No shift was observed when the colistin sensitive wt. *A. baumannii* strain (AbW) was exposed to the device, while a ~300 mV shift occurs in the presence of the colistin resistant strain AbR. As shown in FIG. 8B, while P-KAM8_Control does not interact with AbR, and P-KAM-Probe does not interact with AbW, as expected only shifts in Dirac voltage are registered when P-KAM-Probe is combined with AbR. This confirms that devices functionalized with P-KAM8_Probe are specific for AbR with average voltage shifts of 280 mV and 350 mV at concentrations $10^6$ and $10^7$ cells/ml respectively. (Data represents average and standard deviation of at least 4 independent replicates).

Figure 9:
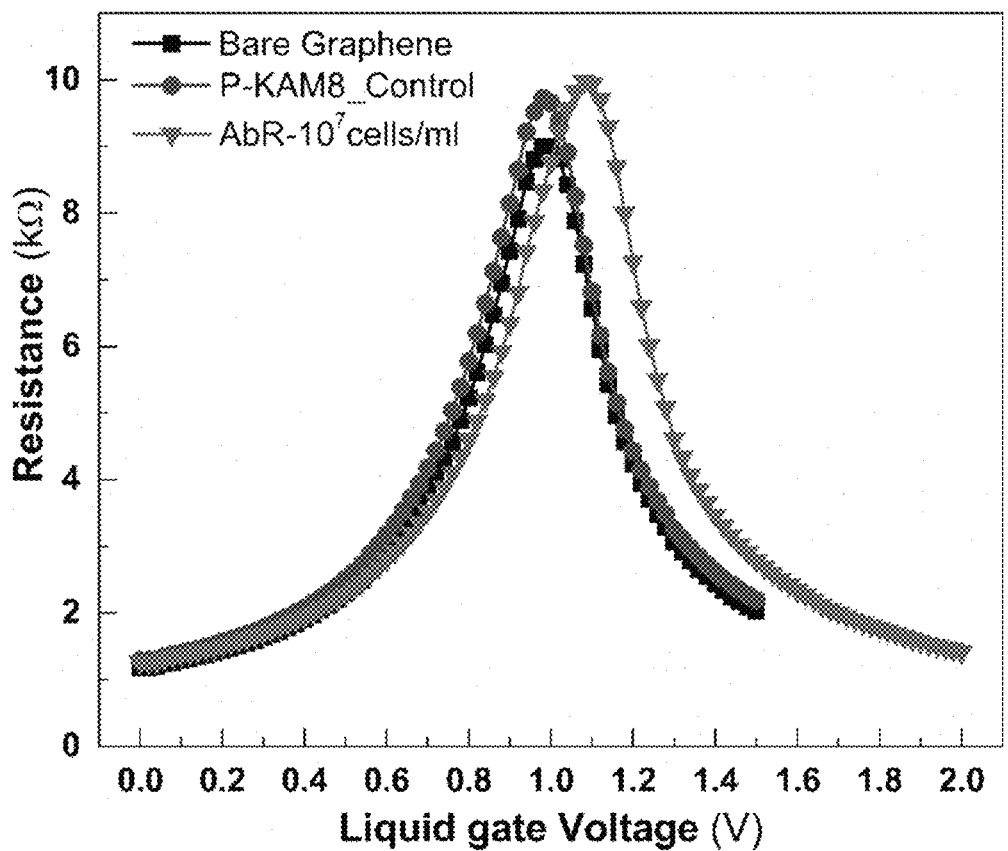
FIG. 9 is a plot of resistance vs voltage of G-FET for detection of *S. aureus*.

FIG. 9 shows resistance vs voltage plots of G-FET for detection of *S. aureus*, G-FET functionalized with control peptides (P-KAM8_Control) and incubated with *A. baumannii* of concentration $10^7$ cells/ml, no notable voltage shift observed neither with peptide and nor with bacteria and no attachment seen.

Figure 10:
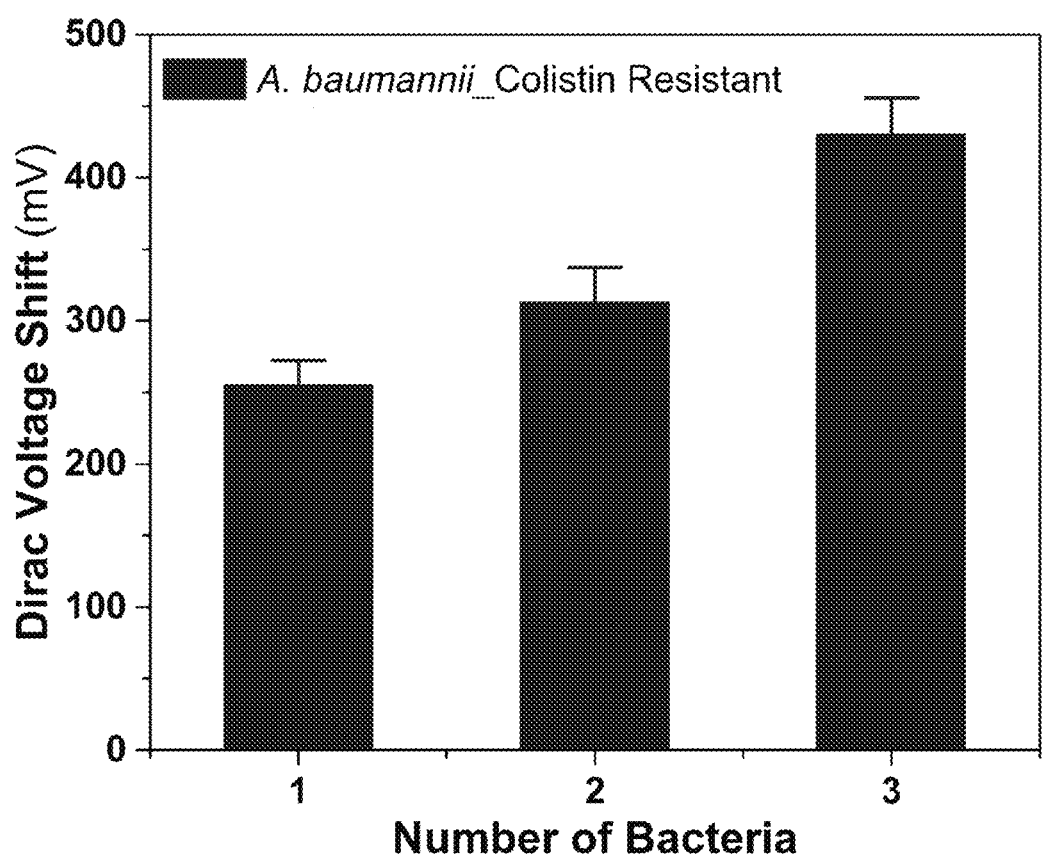
FIG. 10 is a bar chart of the sensitivity of G-FET devices for the detection of colistin-resistant A.

FIG. 10 shows the sensitivity of G-FET devices for the detection of colistin-resistant *A. baumannii* (AbR). Direct quantitative comparison of electrical and optical readouts of G-FETs functionalized with P-KAM8_PROBE post incubation with a $10^7$ cells/ml suspension of *A. baumannii* AbR. Measured Dirac voltage shift of G-FETs having different number of bacteria attached, devices having single bacterium attached show an average shift of ~250 mV and linear increase in voltage shift is observed with increased number of bacteria attached.

Figure 11:
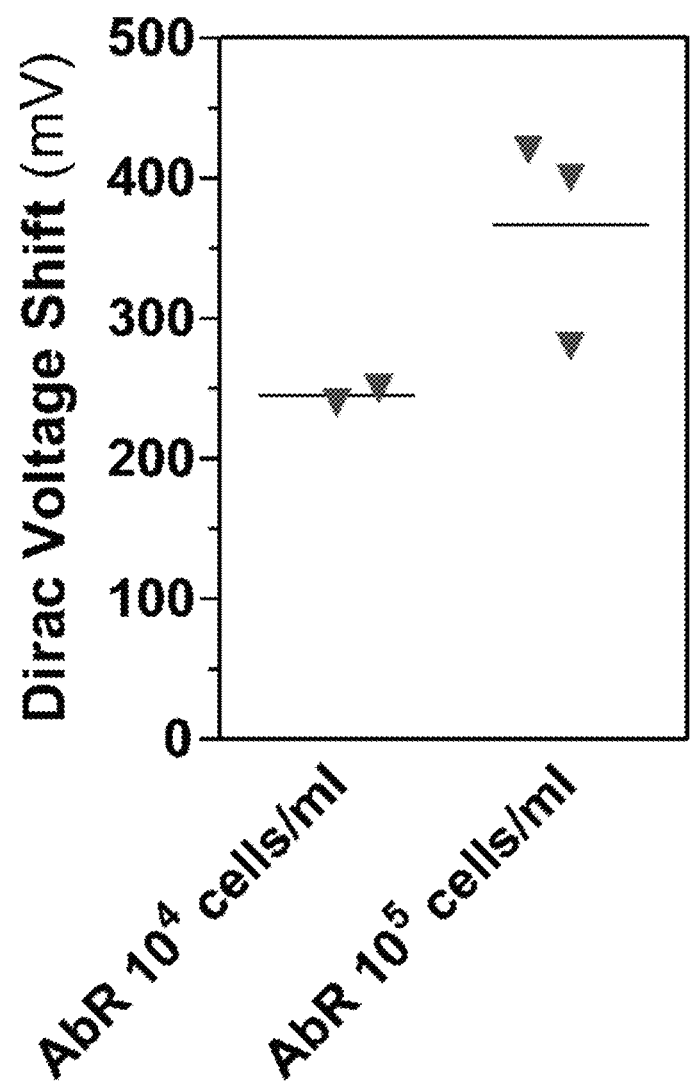
FIG. 11 is a bar chart of average Dirac voltage shift versus concentrations obtained with electric field assisted binding of bacteria *A. baumannii*.

FIG. 11 shows the bar chart of average Dirac voltage shift versus concentrations obtained with electric field assisted binding of bacteria *A. baumannii*.

The present disclosure provides the novel approach for electrical detection of antibiotic resistant bacteria.

The disclosure will be further illustrated with reference to the following specific examples. It is understood that these examples are given by way of illustration and are not meant to limit the disclosure or the claims to follow.

Example 1—G-FET Fabrication and Characterization

G-FETs were fabricated on CVD monolayer graphene transferred over $SiO_2$/Si substrates. Monolayer graphene was grown on copper via low pressure chemical vapor deposition. The copper foil (Alfa Aesar) was pre-treated in Ni etchant (Transene) to remove any coatings or oxide layers from its surface. The tube furnace was evacuated to a read pressure of 200 mTorr with a constant flow of $H_2$ (10 sccm). Prior to growth, the foil was annealed at 1010° C. (ramp rate 25° C./min) for 35 minutes. Growth was done at 1010° C. with 68 sccm of $H_2$ and 3.5 sccm of $CH_4$ for 15 minutes. After growth, a polymethyl methacrylate (PMMA) layer was spin coated on one side of the copper foil and baked for 60 seconds at 60° C. To facilitate smooth and fast etching of the copper foil, the backside graphene was etched out using oxygen plasma with 60-watt power for 60 seconds. The exposed copper was etched away in Ni etchant for 2 h at 60° C. The remaining PMMA/graphene structure was washed in 2 water baths, the first water bath for 60 seconds and the second for 30 minutes, to rinse away leftover etchant. The PMMA/graphene was transferred onto $SiO_2$/Si chips of size 1×1 cm. Any leftover water was slowly dried out with nitrogen gas, and finally the PMMA was dissolved in acetone vapors; isopropanol alcohol (Fischer) was used for a final wash. The chips were baked at 300° C. for 8 h in vacuum followed by deposition of 3 nm AlOx at room temperature by evaporating aluminum at oxygen pressure of $7.5 \times 10^5$ mbar. Substrates were baked at 175° C. for 10 minutes before lithography process. The electrodes patterning was done using bilayer photoresist (LOR1A/S1805) and laser mask writer (Heidelberg Instruments) followed by Au/Cr (45 nm/5 nm) deposition and lift off using remover PG (MicroChem). After that the graphene patterning was done with lithography using same bilayer resist and oxygen plasma etching. Devices were cleaned with remover PG and rinsed with IPA, DI water and dried with Argon. In order to protect the electrodes and edges of the graphene for liquid gating, photolithography was done using S1805 to open the sensing area (10×40 μm) and contact pads while leaving remaining chip covered. The developing time was increased to 90 seconds to etch away the AlOx layer deposited in the beginning to protect the graphene from photoresist. Finally, the chips were baked at 150° C. for 5 minutes and then temperature increased to 200° C. and baked for 5 more minutes to harden the photoresist. To perform the measurement of the devices, two PDMS wells of size 2.5×2.5 mm were fabricated and placed over the chip having two sets of the devices with three devices in each well. 20 μL of diluted 0.01×PBS was filled and a platinum wire of 0.5 mm diameter was used for liquid gating.

SI Peptide Synthesis

Solid phase peptide synthesis was performed on a rink amide resin using Fmoc chemistry. An alloc-protected diaminopropionic acid residue was installed at the C-terminus for on-resin coupling of pyrene. The alloc protecting group was selectively removed by tetrakis (triphenylphosphine) palladium(0) and phenylsilane in DCM for 1 hour. 2 equivalents of 1-Pyrenebutyric acid N-hydroxysuccinimide ester in 20% v/v DIPEA/DMF was added. The coupling was done in 2 hours at room temperature. The peptides were cleaved off resin and globally deprotected with 90% TFA, 5% $H_2O$, 2.5% triisopropylsilane, 2.5% 1,2-ethanedithiol for 2 hours. Crude peptides were obtained via cold ether precipitation and purified by RP-HPLC. For cysteine alkylation, the peptides were treated with 3 equivalents of APBA-IA or IA in 5% v/v DIPEA/DMF for 3 hours and purified via RP-HPLC. All peptides were characterized with LC-MS to confirm their identities and excellent purities (>95%).

Bacterial Strains and Culture Conditions

Detections were made using the following strains: *S. aureus* (ATCC 6538), wild-type *A. baumannii* (AB5075)[50], colistin resistant and LOS deficient *A. baumannii* (5075 LOS-)[51] *B. subtilis*, and *E. coli* (BL 21). All bacteria were cultured overnight in LB broth at 37° C. with 220 rpm constant shaking. The overnight culture was diluted $10^2$ times in fresh media and grown to an $OD_{600}$ of 0.5-1.0. These fresh cultures were then washed and diluted with 1×PBS (pH 7.4) buffer to obtain the desired concentrations.

Supporting Information

G-FETs were functionalized with peptides by incubating with 10 μM concentration of P-KAM5_Probe and P-KAM8_Probe for optimized durations of 2 h and 16 h, respectively (FIG. 3A). The method used to find these times is outlined in the supplementary data. Information supporting the present invention can be found in N. Kumar et al., "Dielectrophoresis Assisted Rapid, Selective and Single Cell Detection of Antibiotic Resistant Bacteria with G-FETs", Biosensors and Bioelectronics 156 (2020) 112123, which is hereby incorporated by reference in its entirety. To minimize the noise in the electrical measurement, G-FETs were characterized by measuring the resistance using a digital multimeter by sweeping Liquid gate voltage between 0 V to a maximum of 1.7 V. The test current was limited to 10 μA reduce the effects of heating the device and prevent failure. The maximum (Dirac voltage) in resistance versus voltage plot was chosen as reference point and shift in the maximum was measured upon bacterial binding. Functionalized G-FETs were incubated with 20 μl desired bacterial solutions in 1×PBS (pH-7.4), while the measurements were performed in 0.01×PBS diluted in DI water to maximize the signal by reducing the Debye screening effect (FIG. 4). A platinum wire of 0.5 mm diameter was used for liquid gating.

G-FET characteristics obtained for detection of *S. aureus* with bare graphene. Stability test results tested by storing functionalized G-FETs for 24 hours in PBS and detection of *S. aureus* performed. Observed Dirac voltage shift with number of bacteria attached achieved by electric field assisted binding at lower concentration $10^4$ and $10^5$ cells/ml of *S. aureus*. Negative Control experiments for electric field assisted binding. Negative control test with P-KAM8_Control and *A. baumannii*. Observed Dirac voltage shift with number of bacteria in detection of *A. baumannii*. Dirac voltage shift with electric field assisted binding of *A. baumannii* to detect lower concentration, i.e., $10^4$ and $10^5$ cells/ml.

Example 2—G-FET Device Construction and Baseline Measurements

G-FET devices were prepared by a low-pressure chemical vapor deposition (CVD) graphene on a standard $SiO_2$/Si substrate and etched into an active area of 20×50 μm, with Cr/Au source and drain. The contacts were passivated and the sensing area (10×40 μm) was defined easily with a conventional hard baked photoresist (S1805), instead of a dielectric (FIG. 1A). To measure the baseline conductance/resistance of a device, they were tested in liquid gate mode where a Pt wire was chosen as reference electrode and 0.01×PBS as electrolyte (FIG. 1B). The measured average Dirac voltage ($V_D$) of the fabricated G-FETs is around 0.7±0.16 V, consistent with the surface potential of the platinum wire and diluted concentration of PBS. The observed variation in the $V_D$ with devices made on various substrates and batches is attributed to the impurities at the graphene/$SiO_2$ interface induced during the graphene transfer process. The mobility was calculated by linearly fitting the hole and electron regimes of conductance (σ) versus voltage ($V_G$) using $$\mu = \frac{L}{W}\frac{1}{C_{LG}}\left(\frac{\partial \sigma}{\partial V_G}\right),$$

where L, W are the length and width of the channel, $C_{LG}$ is the liquid gate capacitance. Value of $C_{LG}$ was taken to be 1.65 μF/cm² based on the sum of the quantum capacitance ($C_Q$) of graphene and electric double layer capacitance ($C_{DL}$) consistent with 0.01×PBS. Results from a high mobility device are shown in FIG. 1B, while the average hole and electron mobility values obtained from different devices are ~670±125 and ~690±83 cm²/V·s, respectively. These mobilities are consistent with reported values for CVD graphene on $SiO_2$ substrates.

Example 3—Bacterial Detection Using G-FETs With Bare Graphene

To confirm the dimensions of the device and operating conditions detect bacteria, a bare G-FET containing a strip of non-functionalized bare graphene was exposed to two types of bacteria: *E. coli* and *Staphylococcus aureus*. Each species was incubated for 45 minutes on different devices at a bacterial suspension of $10^7$ cells/ml. As evident from FIG. 1C, a strong shift in $V_D$ of 360 mV results from exposure to *E. coli* and 220 mV from *S. aureus* (FIG. 2). This positive shift by attachment of *E. coli* is consistent with that observed in back gate mode. These results confirm that the bare graphene is highly sensitive to the bacterial surface charge but cannot distinguish between different bacterial species, strains or resistance state, indicating that G-FET's require specific probes to be integrated on such devices.

Example 4—Peptide-Pyrene Conjugates Enable a Simplified Single-Step Graphene Functionalization Process In order to maintain the electronic properties of graphene, it is preferable to use probes with non-covalent functionalization through π-π stacking of pyrene-based linker molecules. This functionalization typically requires multiple steps, starting at linker attachment and followed by incubation with biosensing probes. As a result, G-FETs are exposed to different solvents with the potential of significantly affecting the doping level of the graphene. This also makes the preparation and functionalization of devices complex, cumbersome, and potentially expensive. Previously a phage display platform that can rapidly select for small peptides that recognize and bind specific bacterial species or strains was developed. KAM5 is one such peptide that was identified in a previous study to specifically detect *S. aureus*, showing an $EC_{50}$ of ~1.5 μM in a cell staining assay. To minimize exposure of G-FET to solvents and facilitate single step functionalization with the desired probe, a peptide-pyrene conjugate (P-KAM5_Probe) was synthesized, by on-resin coupling of 1-pyrenebutyric acid N-hydroxysuccinimide ester (PBASE) onto the diaminopropionic acid residue installed at the C-terminus of the peptide. These pyrene-conjugated peptides are then simply dissolved in aqueous solution incubated on the device for 2 hours followed by a wash step, with no additional chemicals or treatments required. In order to confirm uniform functionalization, P-KAM5_Probe was attached to the patterned bare graphene surface and characterized with atomic force microscopy (AFM; FIG. 1D). The height of graphene functionalized with P-KAM5_Probe increased by ~2.5 nm as compared to the bare graphene surface. This height increase is expected and consistent with peptides attached to carbon nanotubes or graphene oxide, confirming the attachment of the probe to the device. The peptide-pyrene conjugates thus facilitate simplified graphene functionalization by a single step process, which enables rapid and easy preparation of the device as well as reduced fabrication cost. Raman spectrum was carried out to confirm the quality of the CVD graphene used for the G-FET fabrication (FIG. 1E). Obtained 2D peak at 2,679 cm$^{-1}$ and G peak at 1,587 cm$^{-1}$ with the ratio in their intensities i.e. $I_{2D}/I_G$~1.6, confirming the single graphene, while the absence of D peak ~1350 cm$^{-1}$ indicating defect free graphene.

Example 5—Species Specific Detection of a Gram-Positive Bacterial Pathogen

To test the potential of the present G-FET design for detecting specific bacterial species, G-FETs were functionalized with P-KAM5_Probe, which is expected to bind $S.$ $aureus$, or a control peptide (P-KAM5_Control, see Supporting Information for details), in which the key functional groups for binding are missing thereby making it incapable of binding bacteria. As shown in FIG. 3A-B, functionalization of G-FET with either peptide does not show any shift in $V_D$, consistent with their charge neutral structure at pH 7. Upon incubation with $S.$ $aureus$ at $10^7$ cells/ml on a GFET functionalized with P-KAM5_Probe a voltage shift of 300 mV was observed (FIG. 3A). In contrast and as expected, no notable voltage shift was observed when $S.$ $aureus$ was incubated on devices functionalized with P-KAM5_Control (FIG. 3B). To visually confirm that the shift in $V_D$ is due to bacteria attached to the surface of the graphene, devices were analyzed using optical microscopy. $S.$ $aureus$ is a spherically shaped bacterium with an approximate 1 μm diameter, and black dots, representing individual bacterial cells, were observed only on devices functionalized with P-KAM5_Probe and not P-KAM5_Control (inset of FIG. 3A-B). The observed positive shift in the $V_D$ is attributed to the negatively charged surface of bacterial cells which increase the hole carrier density in graphene. To probe the postulated $S.$ $aureus$ specificity of the present G-FET, the peptide functionalized devices were comparatively tested against $Bacillus$ $subtilis$ a different Gram-positive species and $E.$ $coli$ a representative Gram-negative bacterium. No significant shift in $V_D$ was observed when the devices were incubated with either species under the same conditions used for $S.$ $aureus$ (FIG. 3C). Importantly, after rinsing with DI, the same devices were subsequently incubated with $S.$ $aureus$ resulting in an average shift in $V_D$ of ~190 mV, indicating that the devices functionalized with P-KAM5-probe are specific to $S.$ $aureus$ and insensitive to other Gram-positive and negative species.

Additional correlation was found by using optical imaging to count the number of bacteria on each G-FET after electrical detection. Specifically, after measuring 20 devices functionalized with P-KAM5_Probe and incubated with $S.$ $aureus$ followed by inspection with light microscopy it was observed that a strong correlation exists between the number of bacteria that are bound by the probe to the graphene and the registered voltage shift. As shown in FIG. 3D, a linear shift of $V_D$ was seen with increasing number of attached bacteria with a sensitivity of 56.3±7.3 mV/bacteria. Unexpectedly, the devices are able to detect the attachment of a single bacterium with an average voltage shift of 128±18 mV, a nearly 20% increase in the measured $V_D$ over the as-prepared G-FET. Moreover, the voltage shifts of ~130→300 mV (FIG. 3D) that were obtained are much higher than those reported for $S.$ $aureus$ (~25 mV) and $E.$ $coli$ (~60 mV) using silicon-based FET sensors. There are two crucial reasons for this prominent readout. First, the peptide-probes that are implemented here are small in size (~2.5 nm) and have a neutral charge that reduces the Debye screening effect and background signal, respectively. Second, the small device size (10×40 μm) and the measurements at the charge neutrality point enhance the sensitivity of the graphene to the charge of the bacteria. Altogether, these results confirm that G-FETs functionalized with P-KAM5_Probe are capable of detecting $S.$ $aureus$ with high specificity and sensitivity, at the single cell level. Additionally, the peptides functionalized over G-FET remains stable tested after storing for 24 hours in PBS which showed detection capability similar to those used immediately after functionalization (FIG. 4).

Example 6—Improving Sensitivity Via Electric-Field Assisted Bacterial Binding

One potential problem overcome by the present method is the relatively small size of the device, which requires a high bacterial cell density ($10^7$ cells/ml of $S.$ $aureus$) to facilitate the capture of a single bacterium at the graphene surface. The active area of the G-FET is just 10×40 μm, while bacterial cells are distributed in an area of 2.5×2.5 mm, which is the size of the PDMS well placed over the device and which holds the bacterial suspension. Hypothetically this dramatic contrast between the size of the well and that of the graphene limits the likelihood of the bacterial cells reaching the graphene surface, therefore requiring a high cell density for efficient bacterial capture. To improve the sensitivity of G-FET, by applying voltage pulses from the top of the well that holds the sample, the charge of the bacteria was exploited to drive them to the graphene surface. Specifically, a negative voltage of −0.5 V was applied to the Pt electrode with five pulses, 10 seconds in duration to minimize potential damage to the bacteria. FIG. 5 shows a clear shift in $V_D$ after electric field assisted binding at a concentration of $10^5$ and $10^4$ cells/ml of $S.$ $aureus$ respectively, indicating attachment of bacteria to the graphene. Moreover, electric-field assisted binding decreased the original incubation time before bacteria could be detected from 45 minutes to 5 minutes. Similar to the 45 min incubation method without electric field attachment, the Dirac voltage shift found in the electric-field assisted attachment is dependent on the number of bacteria on the device (FIG. 6). Unexpectedly, the presently developed method of electric field assisted binding allows effective detection of $S.$ $aureus$ at $10^4$ cells/ml, which is 3 orders of magnitude lower in cell density than what is required in the absence of applying voltage pulses. Moreover, it also reduces the time needed to perform the measurements by 9-fold. To make sure that the selectivity of the devices is not affected by applying the voltage, $B.$ $subtilis$ and $E.$ $coli$ using P-KAM5_probe devices, and $S.$ $aureus$ using P-KAM5_Control was tested. No shift or bacterial attachment was observed after applying the voltage (FIG. 7).

Example 7—Strain Specific Detection of Gram-Negative Antibiotic Resistant Pathogenic Bacteria The use of peptide probes in the G-FET design offers great versatility in terms of bacterial pathogens that can be targeted. Furthermore, as demonstrated, the peptide probes can be rapidly developed to differentiate antibiotic susceptible and antibiotic-resistant strains of a bacterial pathogen. Integrating such peptide probes into G-FET would allow for specific detection of antibiotic-resistant pathogenic strains. To test this hypothesis, the peptide KAM8 was selected to bind a colistin-resistant strain of *Acinetobacter baumannii* (AB5075 LOS; AbR). Similar to the P-KAM5_Probe, a pyrene conjugate of KAM8 P-KAM8_Probe was synthesized as well as a control peptide (P-KAM8_Control). Functionalizing G-FET with P-KAM8 Probe or P-KAM8_Control caused no shift in $V_D$ (FIG. 8A) confirming their charge neutrality. After incubation with $10^7$ cells/ml of AbR, a $V_D$ shift ranging between 280-460 mV was observed for devices functionalized with P-KAM8_Probe (FIG. 8A) while no notable shift was measured with P-KAM8_Control (FIG. 9). This shows that P-KAM8_Probe effectively captures AbR cells onto the graphene surface triggering a change in $V_D$. In order to confirm the strain specificity of P-KAM8_Probe, the devices were first incubated with the non-colistin resistant wild-type strain of *A. baumannii* (AB5075; AbW) at $10^7$ cells/ml. This triggered no shift in Dirac voltage indicating that P-KAM8_Probe does not interact with the strain. Subsequently, the same device was incubated with the antibiotic-resistant strain AbR which showed a shift of 280 mV confirming the probe interacting with AbR. Additionally, similar to what was observed for the interaction between *S. aureus* and P-KAM5_Probe, the measured voltage shifts correlate with the number of bacterial cells attached to the graphene surface (FIG. 10). A single *A. baumannii* produced a $V_D$ shift of ~200 mV, which is comparatively higher than that obtained with *S. aureus* which likely results from a higher density of surface charge displayed by a Gram-negative bacterium in comparison to Gram-positives.

Lastly, to determine the limit of detection of P-KAM8_Probe functionalized devices, 14 different devices were tested using suspensions of $10^7$ cells/ml and $10^6$ cells/ml of AbR, obtaining average Dirac voltage shifts of about 350 and 280 mV, respectively (FIG. 8B). To reduce the required density, the electric-field assisted binding method was employed. However, it seems that AbR requires higher voltage pulses as no shift was observed when using −0.5V, the setting that worked for *S. aureus*. Attachment of AbR was detected after applying −1V for 100 s, however this seemed to damage the electrodes in the devices. This issue was solved by slowly sweeping the voltage from 0 to −1V with a step voltage of 10 mV, resulting in detection of AbR at cell densities as low as $10^4$ cells/ml (FIG. 11). Taken together, these results demonstrate the potential of the peptide-functionalized G-FETs for specific detection of antibiotic resistant strains of bacterial pathogens. Moreover, results with at least two bacterial strains (*S. aureus* and colistin resistant *A. baumannii* suggest the electric-field assisted binding method drastically improves the detection limit and required measurement time.

In summary, peptide probes selective to two different pathogenic bacteria were conjugated with pyrene linker and successfully integrated on G-FETs in a single step attachment via non-covalent π-π interaction. The small size, neutral nature (chargeless at ~pH 7), long stability, and easy synthesis make these peptide probes optimal for utilization in G-FET based biosensors. The small size of the biorecognition element (probes) reduces the effect of Debye screening while their neutral charge reduces the background signal resulting in an enhanced sensitivity to target biomolecules. Furthermore, the pyrene linker commonly used in graphene-based sensing devices can easily be conjugated to these peptides during synthesis. Thereby, pyrene-conjugated peptides can be directly attached to G-FETs in a single step process, eliminating the need for an intermediate linker attachment step and obviates the use of different required solvents. The G-FET functionalized with pyrene-conjugated peptides successfully detected species and antibiotic resistant pathogenic bacteria in a single platform. Moreover, the devices showed the detection capability of single cell resolution with a sensitivity of ~56 mV/bacterium. Furthermore, by implementing electric field assisted binding of bacteria, the detection speed decreased to 5 minutes from 45 minutes, and the detection limit reduced by 3 orders of magnitude down to $10^4$ cells/ml, which is the threshold at which urinary tract infections or bronchoalveolar lavage fluid are indicated to be disease causing.

Further reduction in detection limit below $10^3$ cells/ml to meet point of care and clinical requirements is desired and could be obtained by optimizing the device design, PDMS well size as well as the electric field application process. Though, increasing the device size could increase the attachment of bacteria at lower concentrations, it may also reduce the sensitivity of the devices due to non-uniformity (e.g. wrinkles or multiple grains) and impurities with large area graphene. Similarly, large area devices would limit the possibility of miniaturization and multiplexing. Importantly, by applying more cycles of incubation and voltage on the same device we achieved bacterial detection even at $10^3$ cells/ml. While, these results showed more variability between replicates, it highlights that further sensitivity improvements are possible. One possible reason for the variability at $10^3$ cells/ml is that in the 20 µL sample that is added to the device there are only ~20 bacterial cells present. As described above the sensing area is small (10×40 µm) compared to the PDMS well that holds the 20 µL sample (2.5×2.5 mm). This means that the bacterial density is just 3.2/mm² and thus even with the applied electric field the travel distance of a bacterium to the probes at the graphene surface remains far, with potential for other locations of attachment. Hence, optimizing the geometry of the PDMS well, resist surface and voltage application process, and/or integrating the system into a PDMS microfluidics chip could help to further reduce the detection limit. Nonetheless, the results show that the combination of pyrene modified peptides along with highly sensitive G-FETs are capable to solve major challenges faced in label free biosensors of bacteria, which potentially opens up a pathway to the development of a reliable platform for point of care diagnostics of infectious diseases.

The invention opens the door to a label free, rapid, cheap detection of bacteria or any other microorganisms or (non) biological molecule (for instance biomarkers from the host such as those produced by the immune system) to solve the need to determine the origin of infection at point of care. This could be of use "in the field" as well as in urgent care settings. Currently this is only done in hospital settings due to the high cost of equipment, need for expertise to operate, expensive chemicals involved and need to store them under special conditions. In principle this invention, may also enable replacement of these techniques in the long run as well.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A label-free bacteria detection system, comprising:
a graphene field effect transistor (G-FET)/peptide device capable of biosensing using dielectrophoresis and comprising a peptide probe formed of a chemically modified peptide conjugated to a flat aromatic linker and capable of recognizing and binding to a bacterial target integrated on the G-FET, wherein the G-FET comprises a defect-free graphene monolayer fabricated into a field effect transistor having electrical contacts insulated from a defined sensing area.

2. The device of claim 1, wherein the bacterial target is pathogenic bacteria.

3. The device of claim 1, wherein the bacterial target is an antibiotic resistant bacterial strain.

4. The device of claim 1, wherein the peptide probe is bacterial species specific.

5. The device of claim 1, wherein the peptide probe is bacterial strain specific.

6. The device of claim 1, wherein the G-FET/peptide device is stable at room temperature.

7. The device of claim 1, wherein the bacterial target includes *S. aureus* (ATCC 6538), wild-type *A. baumannii* (AB5075), *A. baumannii* (5075 LOS-), *B. subtilis*, or *E. coli*.

8. A method for the label-free detection of bacteria, comprising:
fabricating a defect-free graphene monolayer into a graphene field effect transistor (G-FET) having electrical contacts insulated from a defined sensing area;
synthesizing a chemically modified peptide and conjugating the synthesized peptide to a flat aromatic linker to create a peptide probe capable of recognizing and binding to a bacterial target;
integrating the peptide probe on the G-FET to provide a G-FET/peptide device capable of biosensing using dielectrophoresis;
performing electric-field assisted binding of at least one bacterial cell of the bacterial target to the defined sensing area of the G-FET/peptide device; and
electrically detecting the binding of the at least one bacterial cell to the G-FET/peptide device.

9. The method of claim 8, wherein electrically detecting the binding of the at least one bacterial cell comprises monitoring changes in the Dirac voltage.

10. The method of claim 8, wherein the at least one bacterial cell is pathogenic bacteria.

11. The method of claim 8, wherein the at least one bacterial cell is an antibiotic resistant bacterial strain.

12. The method of claim 8, wherein the peptide probe is bacterial species specific.

13. The method of claim 8, wherein the peptide probe is bacterial strain specific.

14. The method of claim 8, wherein the G-FET/peptide device is stable at room temperature.

15. The method of claim 8, wherein the at least one bacterial cell includes *S. aureus* (ATCC 6538), wild-type *A. baumannii* (AB5075), *A. baumannii* (5075 LOS-), *B. subtilis*, or *E. coli*.

16. The method of claim 8, wherein the method has a sensitivity including a detection limit to $10^4$ cells/ml and detection time to below 5 minutes.

17. The method of claim 8, wherein electrically detecting the binding of the at least one bacterial cell includes determining the concentration of the at least one bacterial cell bound to the G-FET/peptide device.

18. The method of claim 8, further comprising:
wherein integrating the peptide probe on the G-FET comprises a single-step attachment of the linker molecule peptide probe to the G-FET.

* * * * *